United States Patent Office 3,399,727
Patented Sept. 3, 1968

3,399,727
METHOD FOR PROPPING A FRACTURE
Harold L. Graham and Othar M. Kiel, Houston, Tex., assignors to Esso Production Research Company, a corporation of Delaware
No Drawing. Filed Sept. 16, 1966, Ser. No. 579,822
10 Claims. (Cl. 166—42)

ABSTRACT OF THE DISCLOSURE

A method for propping a fracture in a subterranean formation using a fluid suspension of impermeable proppant particles. The particles are a ceramic material having internal pores or cells containing a material with a substantially lower density than the ceramic material, for example, a glass sphere having internal voids or bubbles. The low average density of the particles will reduce their tendency to settle in the fluid suspension. The cellular structure will permit localized, partial crushing of the particles rather than complete fragmentation under applied load. Localized crushing will increase the contact area between the particle and the fracture wall which will result in improved load carrying by the proppant particles.

---

This invention relates to the hydraulic fracturing of subsurface formations surrounding a wellbore. A method for propping a hydraulic fracture is provided involving the use of novel propping agents.

Hydraulic fracturing has proven to be a very effective and practical method for stimulating both production wells and injection wells. As generally practiced, the method includes the step of injecting a special fluid into the well at a volumetric rate sufficient to generate a bottomhole pressure at the exposed formation which exceeds the natural compressive stresses, thereby causing the formation to rupture. Continued injection at a high volumetric rate is necessary in order to propagate the fracture a substantial distance from the well.

Once a fracture of suitable dimensions is formed, a successful termination of the method requires that some means be provided to prevent a complete closure of the fracture when the injection rate and pressure are reduced. To this end, a suitable concentration of a particulate propping agent is generally entrained in the fracturing fluid. A round-grain sand of uniform particle size has been generally acknowledged to be a preferred propping agent. Glass spheres and metallic shot have also been widely used.

As the fracture is being generated, its dynamic width must be great enough to permit a relatively unimpeded entry of the propping agent into the fracture, and to permit a substantially uniform distribution thereof throughout a major portion of the fracture. Experience has indicated that a dynamic fracture width of more than twice the proppant particle diameter is required, and preferably at least three times the particle diameter, in order to avoid sand-out or screen-out caused by a bridging of the propping agent particles between the fracture walls.

The extent to which productivity or injectivity of a well is improved by fracturing depends directly on the areal extent and the fluid conductivity of the propped fracture. The conductivity depends on the propped width of the fracture and on the permeability of the propping material when fully loaded by natural compressive stresses. Thus, the distribution of a propping agent within the fracture must be sufficiently dense to bear the imposed load without crushing or embedding, and yet not so dense as to seriously reduce permeability. Proppant distributions have been investigated ranging from a 5% partial monolayer, to multilayer packs 5 to 6 times the diameter of a single particle.

In theory, the preferred distribution of propping agent is a partial monolayer of proppant particles spaced closely enough to support the compressive load without crushing or embedding excessively, while leaving relatively large void spaces between individual proppant particles, thereby providing a minimum or negligible restriction to fluid flow. Laboratory testing has shown that widely spaced individual proppant particles of certain materials do have sufficient strength to resist crushing under the applied load. However, efforts to establish a partial monolayer of proppant in field tests have apparently met with little or no success, since the observed improvements in productivity have not been substantially or consistently greater than those obtained with fully packed fractures.

A possible explanation for the difficulty in vertical fractures is the high settling rate of conventional proppant materials. This tends to result in a high concentration of proppant in the lower portion of the fracture, and an inadequate concentration of proppant in the upper portions of the fracture. Since current trends in fracture analysis indicate that essentially all fractures—at least in deep wells—are vertical, excessive settling rates must be avoided in order to permit the successful placement of a partial monolayer of proppant particles.

In order to maintain fracture width, a proppant particle must not only resist crushing, but also must resist embedment into the fracture walls. The extent to which a proppant particle becomes embedded is directly related to its shape and to the strength of the fracture walls. Since the operator has no control over the strength of a fracture wall, the key to embedment control lies in the shape of the proppant particle. The shape cannot be selected solely for the purpose of minimizing embedment, however, since the particle shape is also important from the standpoint of avoiding screen-out or bridging.

Until reliable techniques are developed for establishing a partial monolayer, many fracturing operations will probably continue to employ concentrations designed to provide a "fully packed" or multilayer proppant pack in the fracture. In a fully packed fracture, the proppant particles are subjected to somewhat different stresses. For example, tests have shown that an individual glass sphere resists crushing satisfactorily when placed in contact with a surface that deforms slightly, thereby spreading the load over a substantial area of the sphere. However, when placed in multilayer packs, glass spheres shatter more readily since the entire load is concentrated upon extremely small points of contact. The generation of fines from shattered spheres is highly objectionable, even if no loss of fracture width occurs, since the fines cause a severe loss of proppant permeability because of their tendency to plug the interstices of the remaining proppant particles.

Summary of the invention

This invention is related to a method for propping fractures in subterranean formations using proppant particles of ceramic material and having at least ten percent by volume of internal cells containing a material having a lower density than the ceramic material.

Accordingly, it is an object of the present invention to generate propped hydraulic fractures having increased fluid conductivities. More particularly, it is an object of the invention to provide propping agents that are capable of maintaining maximum fracture width consistent with high proppant permeability whereby maximum fluid conductivity is achieved.

In accordance with the present invention, the above objects are achieved by the use of a ceramic proppant particle having one or more internal pores or cells of substantially lower density than the ceramic body, including, for example, a glass sphere having a multiplicity of internal bubbles or voids. Such a particle is a superior proppant because of its reduced settling rate in the fracturing fluid, due to its lower average density. Although its load-bearing capacity may be slightly reduced, such a particle does retain a compressive strength sufficient to support the usual loading experienced in propping a fracture. The void space, or gas-filled space, of the propping agents of the invention occupies from 1.0% to 80% of the total volume of the particle, and preferably from 10% to 65%.

In forming a partial monolayer of proppant in a vertical fracture, a low settling rate of the proppant particles is essential in order to permit a substantially uniform distribution of the particles throughout the fracture. It will be apparent that a proppant particle having a density substantially equal to the density of the fracturing fluid has a substantially zero settling rate. Therefore, in accordance with a particular embodiment of the invention, the partial monolayer propping of a hydraulic fracture is accomplished by injecting a fracturing fluid carrying a propping agent of substantially the same density as the fracturing fluid. For example, a silica glass propping agent made up of about 55% voids by volume has a density of approximately 1.0, which is substantially equal to the density of a typical fracturing fluid.

In accordance with a further embodiment of the invention, the density of the fracturing fluid is adjusted by the addition of a weighting agent, to provide a density substantially equal to the density of the propping agent. Suitable weighting agents include $BaSO_4$, $BaO$, $ZnS$, etc.

In accordance with a further aspect of the invention, a propped hydraulic fracture is generated by the use of a ceramic proppant particle having a novel shape, and having one or more internal cells or voids, as stated above. Specifically, the use of glass or other ceramic proppant particles having parallel opposite surface elements and internal voids provides improved fracture conductivity due to the superior ability of such particles to resist crushing and embedment, to their ability to provide increased proppant permeability in multilayer packs, and to their ability to form improved partial monolayers, especially in vertical fractures.

Particles having parallel opposite surface elements include cylinders, parallelepipeds, prisms, cubes, plates, and various other solids of both regular and irregular configurations. A cylinder has parallel opposite surface elements in the sense that lateral loading of a cylinder by parallel fracture walls forms parallel lines of contact on opposite "sides" of the cylinder. Also, a triangular prism, for example, may support the load by face contact with one wall and by edge contact with the opposite wall. The edge formed by two faces of the prism is a parallel opposite surface element with respect to the third face.

The proppant particles of the invention are composed of any of the various commercially available glasses or other high-strength ceramic products. For example, the common soda-lime-silica glasses have sufficient strength for use as a propping agent in many wells. Preferably, a glass of greater than average strength is selected, including the high-silica glasses, the borosilicate glasses, and other known glasses. Other suitable ceramic products include sintered alumina and hard porcelains, such as steatite and mullite.

Glass or other ceramic bodies having internal voids may be made by melting a pulverized ceramic material mixed with a gasifying substance—for example, finely divided carbon. The evolution of gas within the molten ceramic causes the formation of bubbles or voids which are retained upon cooling. By forming the particles of the present invention during such evolution of gas, or at any time before the gas has an opportunity to escape, particles of any desired shape having internal voids may be made. Other methods of forming the voids may be used without departing from the scope of the invention.

The use of elongated cylindrical proppant particles is a preferred embodiment of the invention. Although a right circular cylinder is contemplated, the use of other cylindrical shapes is within the scope of the invention. The diameter of the cylinder lies in the range from 0.02 in. to 0.3 in., and preferably from 0.05 to 0.2 in. The length of the cylinder must exceed its diameter by at least 10%, and preferably at least 30%.

In accordance with a specific embodiment, the elongated cylindrical proppant particles are provided with solid end portions, and with a central portion having one or more voids therein. A selective location of the void space in the central region of the particle provides the desired average density, while preserving maximum strength in the end portions. Similarly, particles of other shapes may be provided with the desired average density by selectively locating the voids in a limited portion of the particle, thereby preserving maximum strength in the remaining portions.

The cubical proppant particles of the invention has an edge length in the range from about 0.02 in. to about 0.3 in., and preferably from 0.05 to 0.2 in. The prisms have a base perimeter in the range from about 0.06 in. to about 0.9 in., and preferably from 0.15 in. to 0.6 in. For best results, the length of the prism should be substantially greater than the diameter of a circle superscribed about the base. The plates have a thickness in the range from 0.01 in. to 0.1 in., and polygonal faces having a perimeter in the range from 0.07 to 1.0 in.

In practicing the invention, the glass or other ceramic particles are added to a fracturing fluid in a concentration from 0.1 lb. per gallon of fluid, up to as much as 10 lbs. per gallon, preferably from 0.5 to 3 lbs. per gallon, when a partial monolayer propped fracture is desired. The higher concentrations generally form a multilayer pack. The proppant-laden fluid is injected into a well in accordance with known fracturing procedures, using conventional equipment.

In accordance with a preferred embodiment, the proppant particles of the invention are added, in the same concentrations as are stated above, to a fracturing fluid having a viscosity of at least 100 cps. and preferably at least 300 cps. The proppant-laden, viscous fluid is injected into a well at a sufficient pressure and flow rate to propagate a fracture at the desired depth, in accordance with known methods for fracturing with a viscous fluid.

The purpose of the viscous fluid is to provide more energy for alignment by laminar flow or plug flow in the fracture and to ensure that settling is minimized since densities cannot be perfectly balanced. The proppant particles are oriented in a highly viscous stream such that their parallel opposite surface elements are maintained in alignment with the direction of flow. Therefore, as the fracture walls close, most of the proppant particles are in position to receive the loading upon opposite parallel surface elements. For example, particles having parallel opposite faces, including the cube and the rectangular prism, are capable of orientation in a viscous fracturing fluid such that the load is imposed upon opposite faces, thereby maximizing their loading capacity.

The use of a particulate plastic propping agent having a cylindrical shape has been previously proposed. However, the significance of particle shape when dealing with a plastic propping agent is essentially unrelated to the specific problem of how to avoid shattering in glass or other ceramic proppant particle packs upon heavy loading. Prior art relating to the use of glass proppant particles has indicated that the more nearly spherical the particles are, the less would be the chance of shattering. We have found instead that shattering is reduced by using the shapes of the present invention.

The non-spherical particles of the present invention have a lower settling rate than spheres, since each has a higher ratio of surface area to volume than does a sphere. The increased contact area also decreases embedment, compared to spheres, since the force imposed thereon by the fracture walls remains constant while the contact area is increased. The permeability of a proppant pack using the particles of the invention is greater than for a pack of spherical particles, due to the different packing arrangements and due to reduced plugging by fragmentation.

A further advantage in using the proppant particles of the invention, especially when the voids are very small, lies in the fact that localized partial crushing of the particles becomes possible, as opposed to the total shattering observed for ordinary glass proppants. Localized crushing increases the area of contact receiving a given load, thereby enabling the particles to resist further crushing.

What is claimed is:

1. A method for propping a fracture in a subterranean formation surrounding a wellbore comprising injecting into the fracture a fluid containing a plurality of substantially impermeable particles consisting substantially of ceramic material, substantially all of the particles having a plurality of internal cells which occupy at least 10 percent by volume of the particles and which contain a material having a density less than that of the ceramic material to permit localized, partial crushing of the particles and increased contact area under applied load.

2. The method as defined by claim 1 wherein the ceramic material is a glass.

3. The method as defined by claim 2 wherein the glass is selected from the group consisting of soda-lime silica, high silica, and borosilicate glasses.

4. The method as defined in claim 1 wherein the density of the particles is approximately equal to that of the fluid.

5. The method as defined in claim 1 wherein the less dense material is a gas.

6. The method as defined by claim 5 wherein the gas is evolved by including finely divided carbon in the ceramic material and heating the ceramic material to a molten state.

7. The method as defined in claim 1 wherein the particles have linear surface elements which are parallel and oppositely disposed with respect to the center of the particles.

8. The method as defined in claim 7 wherein the particles have substantially solid end portions and the less dense material is selectively located between the end portions.

9. The method as defined in claim 1 wherein the particles are substantially spherical.

10. A method for propping a fracture in a subterranean formation surrounding a wellbore comprising injecting into the fracture a fluid containing a plurality of substantially impermeable glass particles, substantially all of the particles having a plurality of internal cells which are gas filled and which occupy at least 10 percent by volume of the particles to permit localized partial crushing of the particles and increased contact area under applied load.

References Cited

UNITED STATES PATENTS

| | | | |
|---|---|---|---|
| 2,421,902 | 6/1947 | Neuschotz | 65—21 X |
| 2,879,847 | 3/1959 | Irwin | 166—42.1 |
| 2,962,095 | 11/1960 | Morse | 166—42.1 |
| 3,155,162 | 11/1964 | Flickinger et al. | 166—42.1 |
| 3,164,208 | 1/1965 | McGuire et al. | 166—42.1 |
| 3,175,615 | 3/1965 | East et al. | 166—42.1 |
| 3,323,594 | 6/1967 | Huitt et al. | 166—42.1 |

CHARLES E. O'CONNELL, *Primary Examiner.*

I. A. CALVERT, *Assistant Examiner.*